J. E. RIDDLE.
SUGAR BOWL.
APPLICATION FILED DEC. 28, 1914.

1,165,907.

Patented Dec. 28, 1915.
2 SHEETS—SHEET 1.

Witnesses
Edw. S. Hall.
Canoee Bailey.

Inventor
James E. Riddle.
By Richard B. Owen.
Attorney

J. E. RIDDLE.
SUGAR BOWL.
APPLICATION FILED DEC. 28, 1914.
1,165,907.
Patented Dec. 28, 1915.
2 SHEETS—SHEET 2.
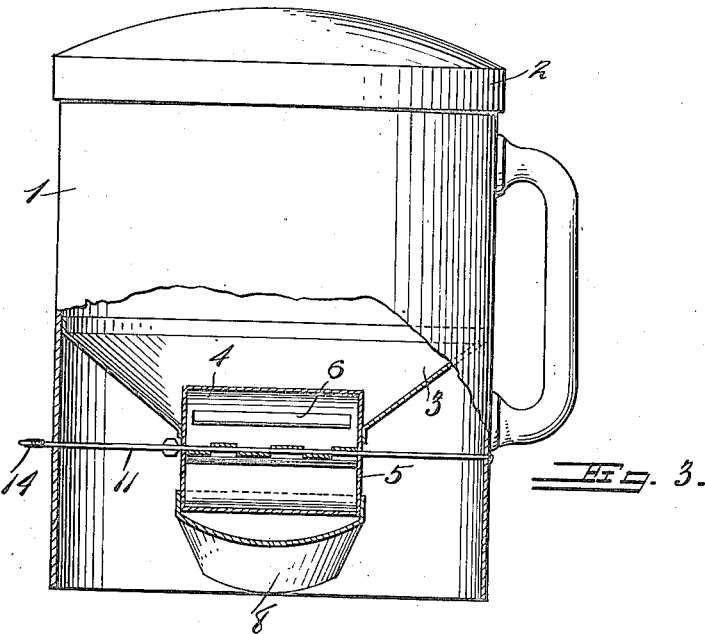
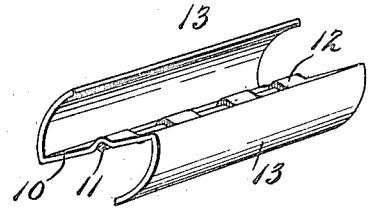
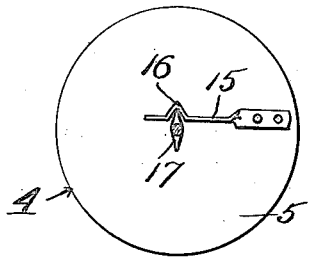
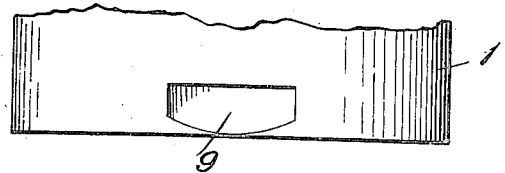
Witnesses
Edw. S. Hall.
Ganvee Bailey
Inventor
James E. Riddle.
By Richard B. Owen.
Attorney

UNITED STATES PATENT OFFICE.

JAMES E. RIDDLE, OF LIMA, OHIO.

SUGAR-BOWL.

1,165,907.　　　　　Specification of Letters Patent.　　Patented Dec. 28, 1915.

Application filed December 28, 1914. Serial No. 879,377.

*To all whom it may concern:*

Be it known that I, JAMES E. RIDDLE, a citizen of the United States, residing at Lima, in the county of Allen and State of Ohio, have invented certain new and useful Improvements in Sugar-Bowls, of which the following is a specification.

This invention relates to sugar bowls and more particularly to that class of sugar bowls which have means for dispensing a predetermined amount of sugar.

An object of the invention is to provide means continuously operative for dispensing the sugar.

Another object is to provide means associated with the shaft of the dispensing means for holding the dispensing means in an operative position after each operation thereof.

With these and other objects in view, the invention consists in the novel features of construction, combination and arrangement of parts as will be hereinafter more fully described, illustrated in the accompanying drawings and claimed.

Figure 1:
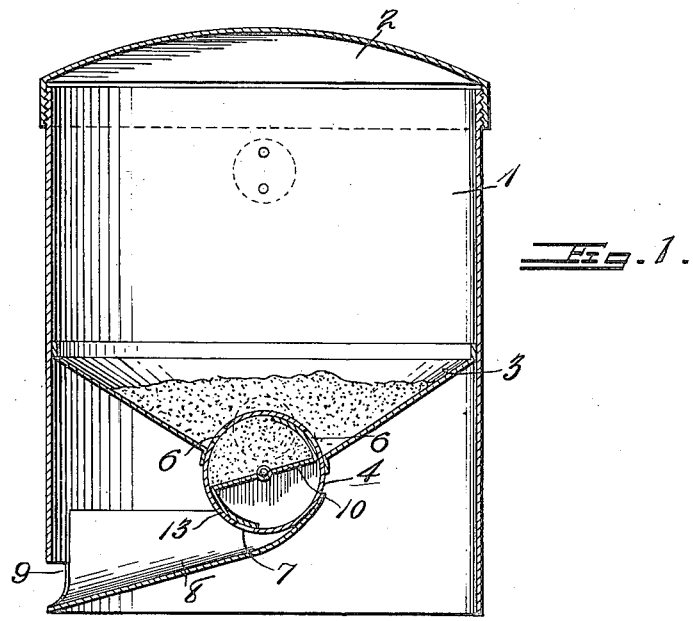
Figure 2:
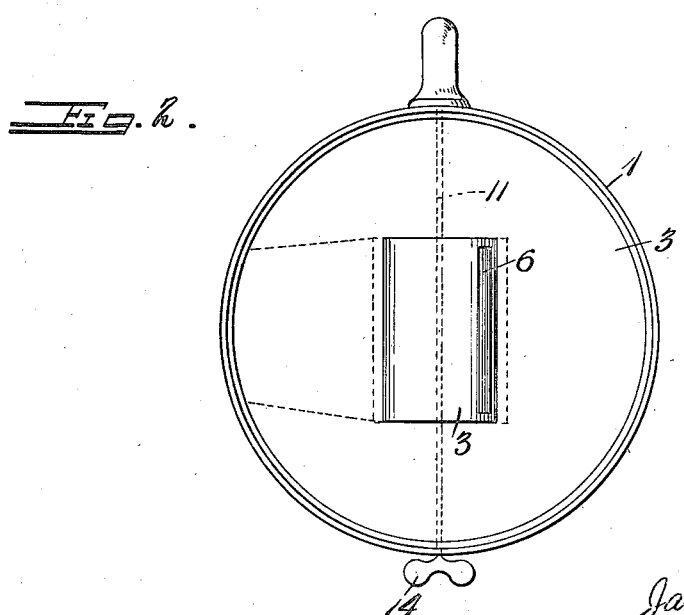

In the drawings:—Figure 1 is a vertical sectional view of the improved sugar bowl; Fig. 2 is a plan view with the cover removed; Fig. 3 is a side elevation showing parts broken away; Fig. 4 is a perspective view of the revoluble plate; Fig. 5 is an end elevation of the cylindrical casing; and Fig. 6 is a detail view of the lower portion of the bowl.

Referring to the drawings by numerals 1 designates a bowl which may be of any desired shape and material, and 2 a cover therefor. A substantially frusto-conically-shaped hopper 3 is mounted in the bowl intermediate the ends thereof and to the lower end of this hopper is secured in any suitable manner a hollow cylindrical casing 4.

The casing 4 is closed at its ends as shown at 5, and upon its upper surface and in communication with the hopper 3, are a pair of openings 6. These openings are adapted to permit sugar contained within the bowl to pass within the casing 4, for a purpose which will subsequently appear.

A third opening 7 is provided in the lower portion of the casing and is adapted to form an outlet for the sugar in its passage from the casing 4 on to a spout 8, this spout being secured to the casing 4 and adapted to form a means for conveying the sugar from the casing 4 to the outside of the bowl, the lower end of the spout 8 communicating with an opening 9 formed in the lower edge of the bowl.

A plate 10 is rotatably mounted within the cylinder upon a shaft 11 which is passed through alternately upwardly and downwardly bent portions 12 formed intermediate the outer ends of the said plate, this construction serving to form a rigid connection between the plate and the shaft. Arcuately shaped extensions 13 are formed on the outer ends of the plate 10, extend in opposite directions therefrom, and are adapted to alternately open and close the openings 6 and 7 of the casing 1 to convey a predetermined amount of sugar from the upper portion of the casing into the lower portion thereof as will be apparent.

The shaft 11 extends through each end of the casing, has one end journaled in the side wall of the bowl, and its other end is provided with an operating finger engaging portion 14. This finger engaging portion 14 serves as a means for operating the plate 1 within the casing 4, exteriorly of the bowl.

A spring arm 15 is secured to one end of the casing 4 and has an upwardly bent substantially V-shaped portion 16 for engagement with projections 17 formed on the shaft 11, the projections being so disposed with relation to the spring as to hold the shaft and plate in a position that sugar cannot pass directly between the casing and the spout.

From the foregoing description taken in connection with the accompanying drawings it is thought that the construction and operation of the device will be clearly understood and while I have herein shown and described one specific form of my invention I do not wish to be limited thereto, except for such limitations as the claim may import.

What is claimed is—

In a dispensing apparatus of the character described, a casing structure having a hopper mounted therein said hopper being provided with an opening adjacent its lower end, a cylinder mounted horizontally in said opening to project partly into said hopper and partly exteriorly thereof, said cylinder provided with longitudinal slots to allow ingress of material from said hopper, and with another slot to allow egress of material therefrom, a rod journaled transversely through said casing structure, a plate mounted on said rod to operate in said cylinder, said plate dividing said cylinder into compartments, extensions on said plate to open and close said slots at certain times, a spout in said casing structure to receive material from said cylinder, means to rotate said rod and said plate, and means to retain said rod against accidental rotation, substantially as and for the purpose specified.

In testimony whereof I affix my signature in presence of two witnesses.

JAMES E. RIDDLE.

Witnesses:
L. FELTZ,
MARY FITZGERALD.